(12) United States Patent
Corfield

(10) Patent No.: US 9,606,767 B2
(45) Date of Patent: Mar. 28, 2017

(54) APPARATUS AND METHODS FOR MANAGING RESOURCES FOR A SYSTEM USING VOICE RECOGNITION

(75) Inventor: Charles Corfield, Boulder, CO (US)

(73) Assignee: NVOQ INCORPORATED, Boulder, CO (US)

( * ) Notice: Subject to any disclaimer, the term of this patent is extended or adjusted under 35 U.S.C. 154(b) by 531 days.

(21) Appl. No.: 13/495,406

(22) Filed: Jun. 13, 2012

(65) Prior Publication Data
US 2013/0339858 A1     Dec. 19, 2013

(51) Int. Cl.
G06F 3/16     (2006.01)
G10L 15/30    (2013.01)

(52) U.S. Cl.
CPC .............. *G06F 3/167* (2013.01); *G10L 15/30* (2013.01)

(58) Field of Classification Search
CPC ....... G06F 3/0482; G06F 3/0484; G06F 3/167
USPC .......................................................... 715/728
See application file for complete search history.

(56) References Cited

U.S. PATENT DOCUMENTS

| | | | | |
|---|---|---|---|---|
| 6,005,549 | A * | 12/1999 | Forest ........................... | 345/157 |
| 6,182,046 | B1 | 1/2001 | Ortega et al. | |
| 6,434,529 | B1 | 8/2002 | Walker et al. | |
| 6,571,209 | B1 | 5/2003 | Cohen et al. | |
| 6,839,668 | B2 | 1/2005 | Kuo et al. | |
| 6,985,865 | B1 * | 1/2006 | Packingham et al. ........ | 704/275 |
| 7,136,817 | B2 * | 11/2006 | Schroder et al. ............. | 704/275 |
| 7,251,604 | B1 * | 7/2007 | Thenthiruperai .......... | 704/270.1 |
| 7,467,353 | B2 | 12/2008 | Kurlander et al. | |
| 7,797,384 | B2 | 9/2010 | Estrada et al. | |
| 7,895,525 | B2 | 2/2011 | Rees et al. | |
| 8,239,207 | B2 * | 8/2012 | Seligman et al. ............ | 704/277 |
| 8,453,058 | B1 * | 5/2013 | Coccaro et al. .............. | 715/727 |
| 8,635,073 | B2 * | 1/2014 | Chang .......................... | 704/275 |
| 8,712,778 | B1 * | 4/2014 | Thenthiruperai .......... | 704/270.1 |
| 2003/0061054 | A1 | 3/2003 | Payne et al. | |
| 2005/0132224 | A1 | 6/2005 | Estrada et al. | |
| 2006/0149558 | A1 * | 7/2006 | Kahn et al. ................... | 704/278 |
| 2007/0061149 | A1 * | 3/2007 | Chang .......................... | 704/275 |
| 2008/0147395 | A1 | 6/2008 | Da Palma et al. | |
| 2008/0147406 | A1 | 6/2008 | Da Palma et al. | |
| 2009/0204386 | A1 * | 8/2009 | Seligman et al. ................ | 704/2 |
| 2009/0210408 | A1 | 8/2009 | Boyer et al. | |
| 2009/0217324 | A1 * | 8/2009 | Massimi ........................ | 725/46 |
| 2010/0332234 | A1 | 12/2010 | Agapi et al. | |
| 2011/0224974 | A1 | 9/2011 | Davis et al. | |
| 2012/0215640 | A1 * | 8/2012 | Ramer et al. .............. | 705/14.55 |

FOREIGN PATENT DOCUMENTS

CN          101375288 A      2/2009

OTHER PUBLICATIONS

Korean Intellectual Property Office, International Search Report and Written Opinion dated Aug. 28, 2013 for PCT/US2012/045573.

\* cited by examiner

*Primary Examiner* — Nicholas Augustine
(74) *Attorney, Agent, or Firm* — Perkins Coie LLP

(57) ABSTRACT

The technology of the present application provides a method and apparatus to manage speech resources. The method includes detecting a change in a speech application that requires the use of different resources. On detection of the change, the method loads the different resources without the user needing to exit the currently executing speech application. The apparatus provides a switch (which could be a physical or virtual switch) that causes a speech recognition system to identify audio as either commands or text.

11 Claims, 8 Drawing Sheets

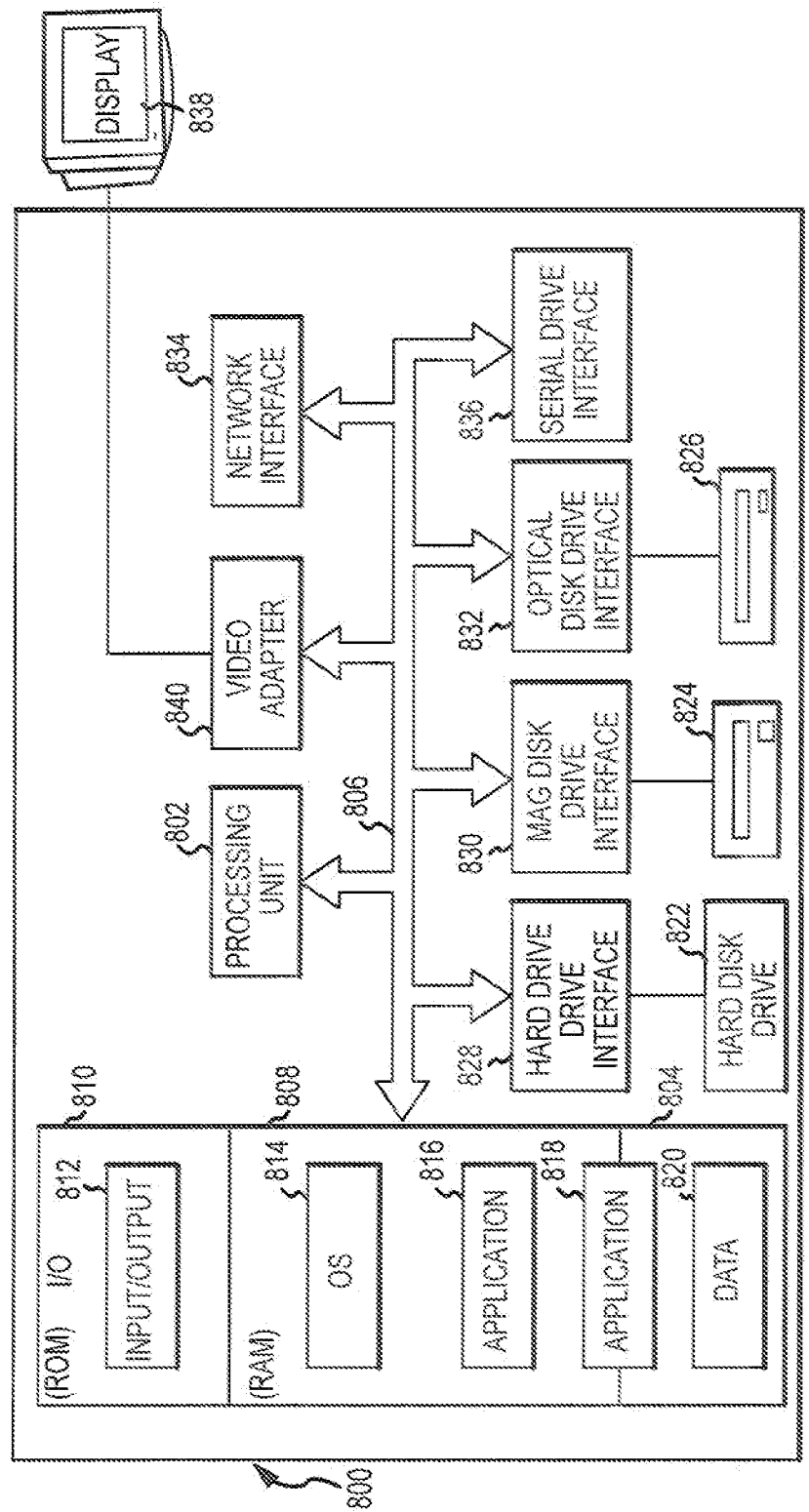

APPARATUS AND METHODS FOR MANAGING RESOURCES FOR A SYSTEM USING VOICE RECOGNITION

CLAIM OF PRIORITY UNDER 35 U.S.C. §§119 AND 120

None.

REFERENCE TO CO-PENDING APPLICATIONS FOR PATENT

None.

BACKGROUND

Field

The technology of the present application relates generally to speech recognition systems, and more particular, to apparatuses and methods to allow for managing resources for a system using voice recognition.

Background

Speech recognition and speech to text engines such as are available from Microsoft, Inc., are becoming ubiquitous for the generation of text from user audio. The text may be used to generate word documents, such as, for example, this patent application, or populate fields in a user interface, database, or the like. Conventionally, the speech recognition systems are machine specific. The machine includes the language model, speech recognition engine, and user profile for the user (or users) of the machine. These conventional speech recognition engines may be considered thick or fat clients where a bulk of the processing is accomplished on the local machine.

More recently, companies such as nVoq located in Boulder, Colo. have developed technology to provide a distributed speech recognition system using the Cloud. In these cases, the audio file of the user is streamed or batched to a remote processor from a local device. The remote processor performs the conversion (speech to text or text to speech) and returns the converted file to the user. For example, a user at a desktop computer may produce an audio file that is sent to a text to speech device that returns a Word document to the desktop. In another example, a user on a mobile device may transmit a text message to a speech to text device that returns an audio file that is played through the speakers on the mobile device.

While dictation to generate text for documents, a clipboard, or fields in a database are reasonably common, the use of audio to command a computer to take particular actions, such as, for example, invoking or launching an application, navigating between windows, hyperlinking or viewing URLs and the like is less common. Currently, Microsoft, Inc.'s Windows® operating system contemplates using voice commands to naturally control applications and complete tasks. Using voice, a user can speak commands and have the computer take actions to facilitate operation.

However, it has been found that many applications of speech recognition have a difficult time distinguishing commands from dictation. The inability for the machine to clearly delineate between dictation to transcribe and commands to take action leads to frustration on the part of the user and decreased use of a powerful tool.

Moreover, as speech recognition becomes more commonplace, clients will use speech recognition in multiple settings, such as, for example, job related tasks, personal tasks, or the like. As can be appreciated, the language models used for the various tasks may be different. Even in a job setting, the language model for various tasks may vary drastically. For example, a client may transcribe documents for medical specialties such as cardiovascular surgery and metabolic disorders. The language model, shortcuts, and user profiles for the vastly different, but related, transcriptions require the client to have different language models to effectively use speech recognition. Conventionally, to have access to different language models, a client would need a completely separate account and identification. Moreover, commands to change language models are difficult to convey in conventional computing systems as explained above.

Thus, against this background, it is desirable to develop improved apparatuses and methods for managing resources for a system using voice recognition.

SUMMARY

To attain the advantages, and in accordance with the purpose of the technology of the present application, methods and apparatus to allow speech applications to load speech resources specific to the application without the need for a client to terminate an existing logon are provided. In particular, the method, apparatus, and system provide data from a client workstation regarding a first speech application and a first set of speech resources being used by the first speech application. Moreover, data regarding a switch in applications at the workstation is received at an administrator or manager that determines whether the new application requires different resources than the first application. The administrator or manager subsequently loads the different resources to facilitate the operation of the second application.

In certain aspects, the speech resources relate to dictation resources for a natural language processor. In particular, the speech resources may include a language model modified by a particular user profile for the application. In other aspects, the speech resources may include shortcuts and inserts for use by the system to make transcriptions.

In other aspects, the resources may relate to voice activated commands to cause the workstations to execute or function. In some aspects, the voice activated commands may cause the execution of scripts or macros. In other aspects, the voice activated commands may cause the processor of the workstation to emulate keystrokes or the like. In still other aspects, the voice activated commands may cause, navigation of a network using, for example universal resource locator identifications.

The foregoing and other features, utilities and advantages of the invention will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

FIG. 8 is functional block diagram of a workstation of FIG. 1 consistent with the technology of the present application.

DETAILED DESCRIPTION

Figure 1:
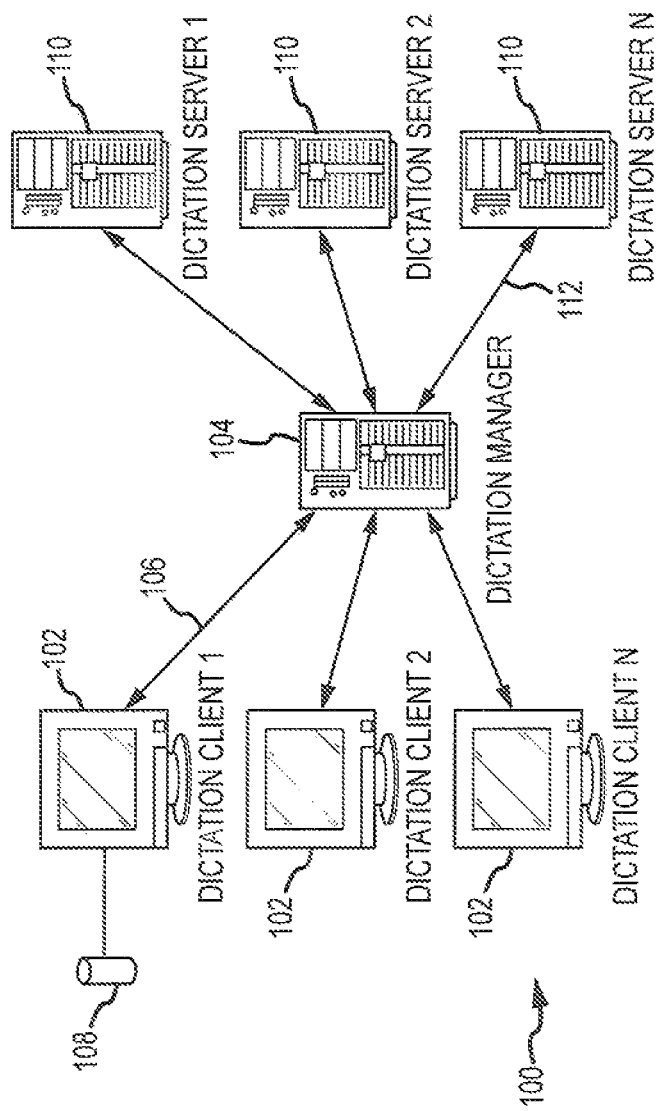
FIG. 1 is a functional block diagram of a distributed speech recognition system consistent with the technology of the present application.

The technology of the present application will now be explained with reference to the figures. While the technology of the present application is described with relation to a speech recognition system using natural language or continuous speech recognition, one of ordinary skill in the art will recognize on reading the disclosure that other configurations are possible. Moreover, the technology of the present application will be described with reference to particular discrete processors, modules, or parts, but one of ordinary skill in the art will recognize on reading the disclosure that processors may be integrated into a single processor or server or separated into multiple processors or servers. Moreover, the technology of the present application will be described generically and portions of the present application may be loaded onto a particular user's workstation (fat or thick client) or hosted by a server that is accessed by the workstation (thin client). Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Conventionally, speech recognition systems may be considered isolated applications of a speech system (whether a thick or thin application). In other words, when a user invokes or launches a speech recognition application, the system loads or accesses the language model and user profile associated with the unique user identification or with that deployment of the speech recognition software, hardware, or combination thereof. As speech recognition becomes ubiquitous, however, individuals may have multiple uses for the speech recognition. The uses may be related, but typically they will differ. The different tasks will generally require a new set of resources, a new language model, new shortcuts, a new (or at least different) user profile, and the like (generically referred to as resources). Under current models, to obtain such new functionality, the user closes an existing operation and reopens the speech recognition application using different information to allow access to different resources.

Moreover, under conventional speech recognition systems, if a user requires access to a function, application, or resource for any task, the function, application, or resource is generally available for all tasks. This can result in an inefficient use of resources.

The technology of the present application provides a distributed speech recognition system that allows a user or administrator to manage resources more seamlessly. Additionally, the technology of the present application provides a mechanism to allow a user to navigate between resources using voice commands. In certain applications, the speech recognition system may identify a resource and load appropriate resources in lieu of being commanded to do so.

Now with reference to FIG. 1, a distributed speech recognition system 100 is shown. Distributed dictation system 100 may provide transcription of dictation in real-time or near real-time allowing for delays associated with transmission time, processing, and the like. Of course, delay could be built into the system to allow, for example, a user the ability to select either real-time or batch transcription services. In this exemplary embodiment, distributed dictation system 100 includes one or more client stations 102 that are connected to a dictation manager 104 by a first network connection 106. For non-speech recognition resources, dictation manager 104 may be generically referred to as a resource manager. First network connection 106 can be any number of protocols to allow transmission of data or audio information, such as, for example, using a standard internet protocol. In certain exemplary embodiments, the first network connection 106 may be associated with a "Cloud" based network. As used herein, a Cloud based network or Cloud computing is generally the delivery of computing, processing, or the like by resources connected by a network. Typically, the network is an internet based network but could be any public or private network. The resources may include, for example, both applications and data. A conventional cloud computing system will be further explained herein below with reference to FIG. 2. With reference back to FIG. 1, client station 102 receives audio for transcription from a user via a microphone 108 or the like. While shown as a separate part, microphone 108 may be integrated into client station 102, such as, for example, a cellular phone, tablet computer, or the like. Also, while shown as a monitor with input/output interfaces or a computer station: client station 102 may be a wireless device, such as a WiFi enabled computer, a cellular telephone, a PDA, a smart phone, or the like.

Dictation manager 104 is connected to one or more dictation services hosted by dictation servers 110 by a second network connection 112. Similarly to the above, dictation servers 110 are provided in this exemplary speech recognition system, but resource servers may alternatively be provided to provide access to functionality. Second network connection 112 may be the same as first network connection 106, which may similarly be a cloud system. Dictation manager 104 and dictation server(s) 110 may be a single integrated unit connected by a bus, such as a PCI or PCI express protocol. Each dictation server 110 incorporates or accesses a natural language or continuous speech transcription engine as is generally understood in the art. In operation, the dictation manager 104 receives an audio file for transcription from a client station 102. Dictation manager 104 selects an appropriate dictation server 110, using conventional load balancing or the like, and transmits the audio file to the dictation server 110. The dictation server 110 would have a processor that uses the appropriate algorithms to transcribe the speech using a natural language or continuous speech to text processor. In most instances, the dictation manager 104 uploads a user profile to the dictation server 110. The user profile, as explained above, modifies the speech to text processer for the user's particular dialect, speech patterns, or the like based on conventional training techniques. The audio, once transcribed by the dictation server 110, is returned to the client station 102 as a transcription or data file. Alternatively, the transcription or data file may be saved for retrieval by the user at a convenient time and place.

Figure 2:
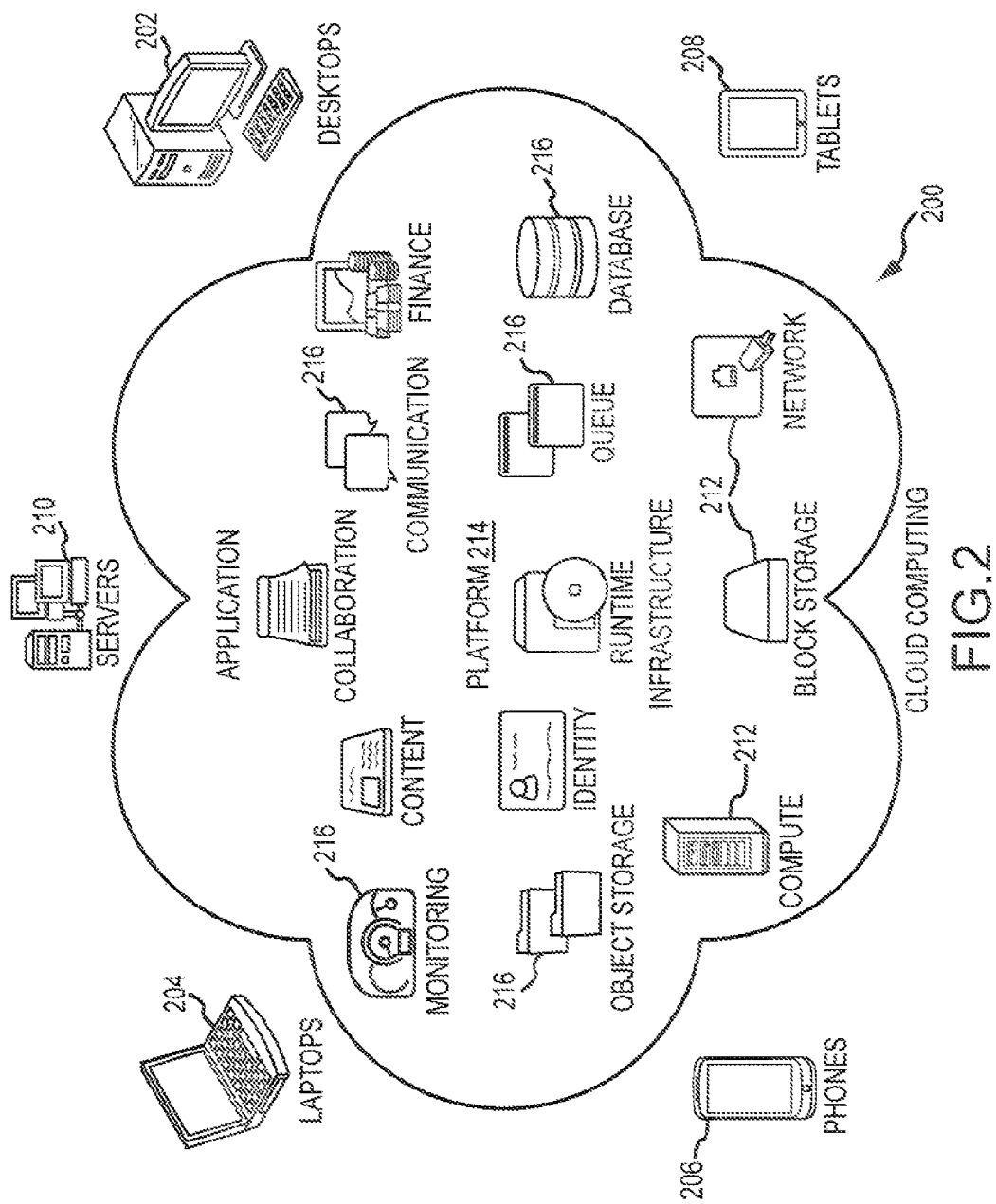
FIG. 2 is a functional block diagram of a cloud computing network consistent with the distributed speech recognition system of FIG. 1.

Referring now to FIG. 2, the basic configuration of a cloud computing system 200 will be explained for completeness. Cloud computing is generally understood in the art, and the description that follows is for furtherance of the technology of the present application. As provided above, cloud computing system 200 is arranged and configured to deliver computing and processing as a service of resources shared over a network. Clients access the Cloud using a network browser, such as, for example, Internet Explorer® from Microsoft, Inc. for internet based cloud systems. The network browser may be available on a processor, such as a desktop computer 202, a laptop computer 204 or other mobile processor such as a smart phone 206, a tablet 208, or more robust devices such as servers 210, or the like. As shown, the cloud may provide a number of different computing or processing services including infrastructure services 212, platform services 214, and software services 216. Infrastructure services 212 may include physical or virtual machines, storage devices, and network connections. Platform services may include computing platforms, operating systems, application execution environments, databases, and the like. Software services may include applications accessible through the cloud such as speech-to-text software and text-to-speech software and the like.

Figure 3:
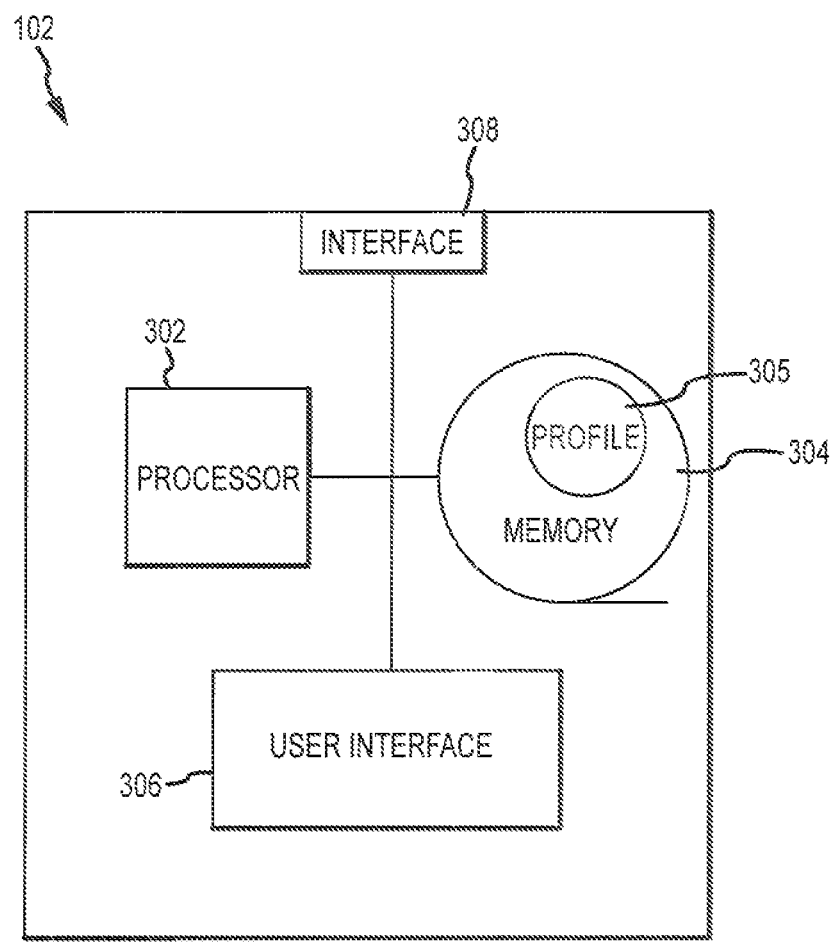
FIG. 3 is a functional block diagram of a computing device consistent with the technology of the present application.

Referring to FIG. 3, workstation 102 is shown in more detail. As mentioned above, workstation 102 may include a laptop computer, a desktop computer, a server, a mobile computing device, a handheld computer, a PDA, a cellular telephone, a smart phone, a tablet or the like. The workstation 102 includes a processor 302, such as a microprocessor, chipsets, field programmable gate array logic, or the like, that controls the major functions, of the manager, such as, for example, obtaining a user profile with respect to a user of client station 102 or the like. Processor 302 also processes various inputs and/or data that may be required to operate the workstation 102. Workstation 102 also includes a memory 304 that is interconnected with processor 302. Memory 304 may be remotely located or co-located with processor 302. The memory 304 stores processing instructions to be executed by processor 302. The memory 304 also may store data necessary or convenient for operation of the dictation system. For example, memory 304 may store the transcription for the client so that the transcription may be processed later by the client. A portion of memory 304 may include user profiles 305 associated with user(s) workstation 102. The user(s) may have multiple language models and user profiles depending on the tasks the user is performing. The user profiles 305 also may be stored in a memory associated with dictation manager 104 in a distributed system. In this fashion, the user profile would be uploaded to the processor that requires the resource for a particular functionality. Also, this would be convenient for systems where the users may change workstations 102. The user profiles 305 may be associated with individual users by a pass code, user identification number, biometric information or the like and is usable by dictation servers 110 to facilitate the speech transcription engine in converting the audio to text. Associating users and user profiles using a database or relational memory is not further explained except in the context of the present invention. Memory 304 may be any conventional media and include either or both volatile or nonvolatile memory. Workstation 102 generally includes a user interface 306 that is interconnected with processor 302. Such user interface 306 could include speakers, microphones, visual display screens, physical input devices such as a keyboard, mouse or touch screen, track wheels, cams or special input buttons to allow a user to interact with workstation 102. Workstations have a network interface 308 (as would the dictation manager and the dictation server of this exemplary embodiment) to allow transmissions and reception of data (text, audio, or the like) between networked devices. Dictation manager 104 and dictation servers 110 would have structure similar to the dictation manager.

Additionally, while the various components are explained above with reference to a cloud, the various components necessary for a speech recognition system may be incorporated into a single workstation 102. When incorporated into a single workstation 102, the dictation manager may be optional or the functionality of the dictation manager may be incorporated into the processor as the dictation server and speech to text/text to speech components are the components associated with the invoked application.

Figure 4:
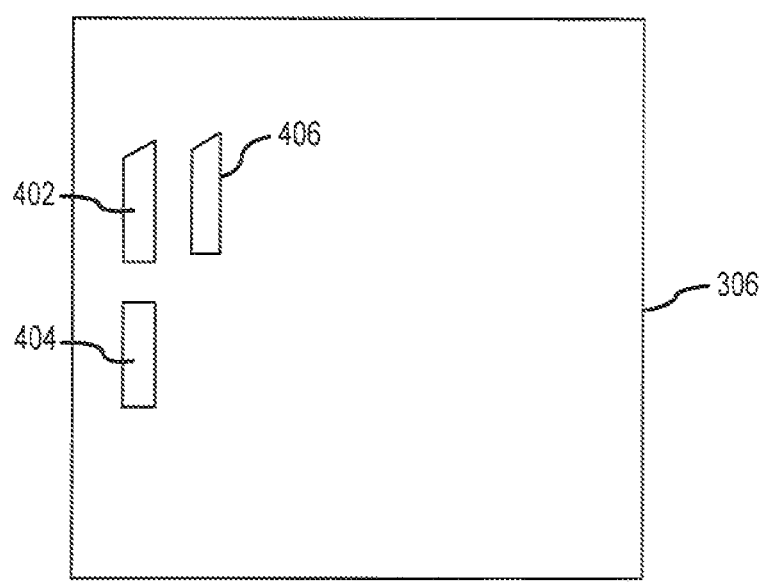
FIG. 4 is a diagram of a user interface providing control icons associated with the technology of the present application.

As shown in FIG. 4, in certain aspects of the present technology, workstation 102 may include a user interface 306 that includes a graphical user interface. The graphical user interface may include a number of executable icons (or clickable icons) that provide information to the processor associated with the workstation. While a number of icons may be available depending on the available data, applications, and processes for a particular workstation, two icons are shown herein. The user interface 306 may include a first icon 402 designated "command", "resource management", or the like. A second icon 404 may be designated "transcription", "data", or the like. In some cases, there may be multiple icons for the features. In still other cases, only the first or second icon may be provided indicating a default input mode when the icon is not activated. The icons could similarly be replaced by physical switches, such as, for example, a foot pedal, a hand switch, or the like. In still other embodiments, the user interface may include drop down menus, a tool bar, or the like.

Figure 5:
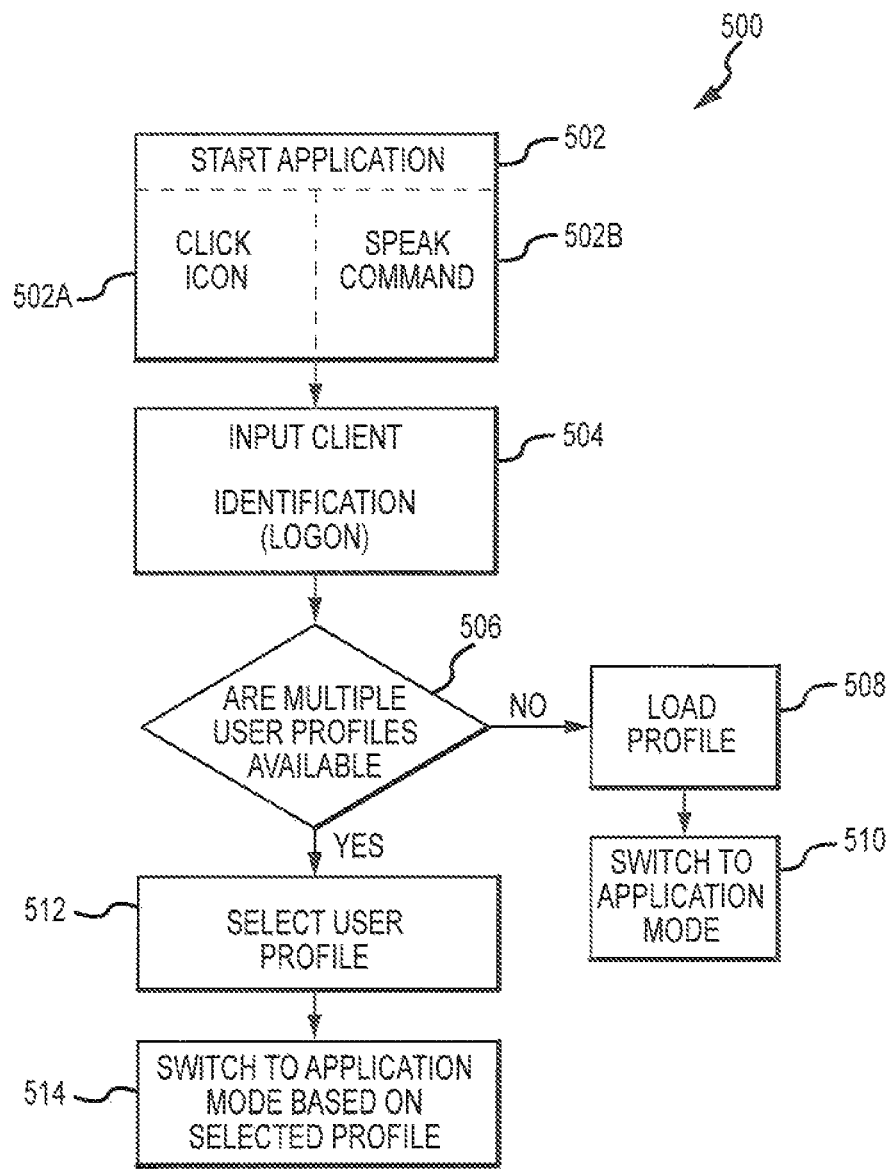
FIG. 5 is a flow chart illustrative of a methodology of managing resources consistent with the technology of the present application.

Referring now to FIG. 5, a flow chart 500 is provided illustrative of a methodology of how a user would manage resources between, for example, a personal speech recognition configuration and a work speech recognition configuration when initiating or invoking a dictation system. First, the client at client station 102 would invoke the dictation application, step 502, which would cause a user interface to be displayed on the client station 102. Invoking the dictation application may include clicking a dictation icon (such as icon 406 in FIG. 4) or, alternatively, invoking the dictation application may include clicking the resource management icon 402, step 502A, and speaking "Invoke Dictation" (or dictation, or some other indicative command word), step 502B. In a distributed system, as shown in FIG. 1 above, the client may log into the system using a unique identification such as a user name and password as is conventionally known in the art, step 504. Assuming resource management icon 402 is still active, the logon may include speaking a user name and password, such as, for example, the client may speak: (1) user name: Charles Corfield followed by (2) password: Charles1. Next, the system would determine whether one or more user profiles are available for the client, step 506. If only one user profile is available, the system next may automatically switch to dictation mode with the available user profile, step 508. If multiple user profiles are available, the client would select the applicable profile, step 510, by stating the category of the applicable user profile, such as, for example, "legal," step 512. Alternatively, a default may be set such that one of a plurality of resources loads automatically on logon. Once the applicable user profile is selected, the system may automatically switch to dictation mode while the processer loads and/or fetches the applicable user profile from memory, step 514.

As mentioned above, the speech recognition may initiate with a default setting. The default setting, in certain aspects, may be associated with tags identifying resources for the default setting, which may include, for example, a resource of reporting weather related information or traffic related information for a particular geographic area. The tags may be set by the client or an administrator for the client. In some embodiments, the default setting may be associated with a job description, job tasks, a position in a hierarchal system, or the like.

Figure 6:
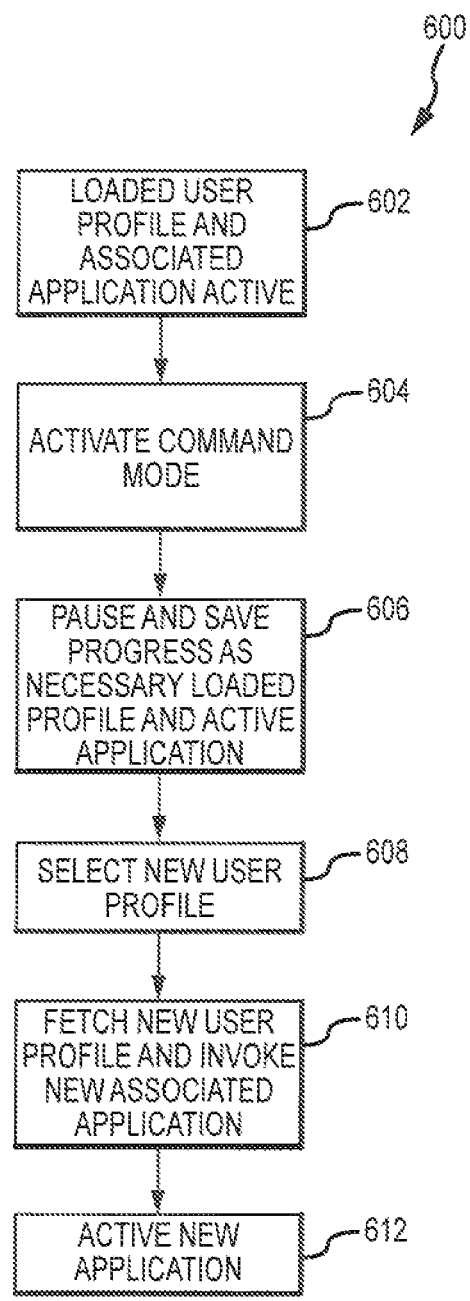
FIG. 6 is a flow chart illustrative of a methodology of managing resources consistent with the technology of the present application.

The icons also facilitate changing profiles while operating the dictation system. FIG. 6 is a flow chart 600 illustrative of a methodology of how a user would switch resources between, for example, a work user profile to a personal user profile. For example, assuming the client is actively dictating a medical document, step 602. To change user profiles, the client would click command icon 402, step 604. Clicking command icon 402 would pause and save the present dictation and transcription, step 606. The client would next select the user profile to be activated by speaking, for example, "personal," step 608. The processor would fetch and load the personal user profile for the client, step 610, and optionally switch to dictation mode, step 612. The user profile for the preceding dictation, in this case the medical user profile, may be saved locally or at the dictation server until the client either logs out of the system or transitions back to the medical dictation. In some aspects, the technology of the present application may unload the previous dictation user profile due to resource constraints.

Figure 7:
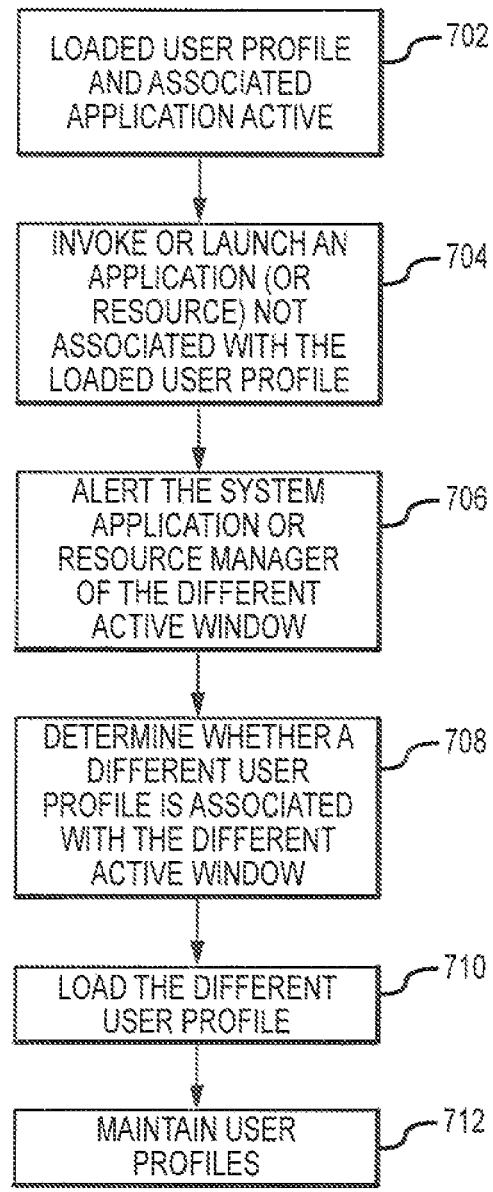
FIG. 7 is a flow chart illustrative of a methodology of managing resources consistent with the technology of the present application.

In certain embodiments, the system may automatically recognize the resource configuration necessary based on the working fields activated by the user. With reference to FIG. 7, a flow chart 700 illustrative of the speech recognition system may automatically switch user profiles and language models depending on user action not directly related to the speech recognition system. For example, a user may initialize the speech recognition system similar to the process described above. For exemplary purposes, the client may be a customer service representative so the client would have both a speech recognition system activated as well as, for example, a customer relationship management (CRM) application. The CRM application contains a plurality of fields to allow the client to, for example, activate the field such that the audio is transcribed using the distributed speech recognition system and the dictation servers return data from the converted audio to populate the active field, step 702. Next, the client may activate a different application or functionality, such as, for example, a personal email account, step 704. The workstation 102 transmits a signal to the dictation manager 104 that the workstation 102 now has a different active window, step 706. Rather than transmitting the change, the information regarding active information may be received by the administrator, which is the dictation manager in this example, via a polling process, via registering a handler to pull application focus information from the workstation and provide it to the dictation manager, or audio patterns may change. The dictation manager 104 would register the different application and determine whether a different user profile or language model is applicable or linked to the different application, step 708. On recognition of the different user profile and/or language model, the dictation manager would download (or upload) the different user profile and/or language model to allow transcription to continue for the active application, step 710, which in this case is a personal email account. Generally, the original user profile and language model will be retained in memory to reduce the transition time if the user reactivates the original application, which in this case is the CRM application. However, the original user profile and language model could be subsequently unloaded from memory. Optionally, all the user profiles, language models, or resources may be maintained until such a time the associated application is terminated at the workstation, step 712.

While described with specific reference to a speech recognition system, the technology of the present application relates to changing commands and responses by the processor as well. For example, while the above examples relate to dictation/transcription where an acoustic model maps sounds into phonemes and a lexicon that maps the phonemes to words coupled with a language model that turns the words into sentences, with the associated grammar models (such as syntax, capitalization, tense, etc.), other resources may be used. In some aspects of the technology, for example, the system may allow for inserts of "boiler plate" or common phrases. The inserts may require an audio trigger, a keystroke trigger, or a command entry to trigger the boiler plate insertion into the document. Other aspects may provide for a navigation tool where a trigger is associated with a unique resource locator, which URLs could be associated with a private or public network. Still other aspects may provide for other scripts, macros, application execution, or the like by pairing the commands with trigger audio, keystrokes, or commands similar to the above.

Referring now to FIG. 8, a functional block diagram of a typical workstation 800 for the technology of the present application is provided. Workstation 800 is shown as a single, contained unit, such as, for example, a desktop, laptop, handheld, or mobile processor, but workstation 700 may comprise portions that are remote and connectable via network connection such as via a LAN, a WAN, a WLAN, a WiFi Network, Internet, or the like. Generally, workstation 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application, to function as described. Workstation 800 generally includes one or more of a hard disk drive 822 (which also includes flash drives, solid state drives, etc., as well as other volatile and non-volatile memory configurations), a magnetic disk drive 824, or an optical disk drive 826. The drives also may include flash drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown).

Workstation 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Workstation 700 also may have USB ports or wireless components, not shown. Workstation 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor for managing speech resources for a plurality of applications, the method comprising the steps of:

providing data from a client workstation regarding a first speech application and a first set of speech resources being used by the first speech application, the first speech application being a natural language speech recognition application, wherein the first set of speech resources comprises at least a first language model and a first user profile used by the first speech application to convert audio to text, and wherein providing the data regarding the first speech application and the first set of speech resources comprises:
  initiating the first speech application at the client workstation,
  transmitting identification of a client initiating the first speech application at the client workstation, and
  delivering the first set of speech resources based on at least one of the first speech applications or the identification of the client;
receiving data from the client workstation indicative of a switch from the first speech application to a second application;
on receiving the data indicative of the switch from the first speech application to the second application, saving a transcription generated by the first speech application using the first set of speech resources;
determining whether the second application being used at the client workstation requires a second set of speech resources, wherein the second set of speech resources comprises at least a second language model and a second user profile used by the second application to convert audio to text, wherein the first language model and the first user profile are different than the second language model and the second user profile; and
loading the second set of speech resources that comprise at least the second language model to facilitate operation of the second application, wherein the client does not log out of the first speech application prior to initiating the second application.

2. The method of claim 1 wherein the second application is a natural language speech recognition application.

3. The method of claim 1 wherein receiving the data from the client workstation indicative of the switch comprises:
  determining a voice command input prompt has been initiated at the client workstation,
  receiving the voice command to switch application, and
  causing the client workstation to execute the voice command.

4. The method of claim 1 wherein receiving the data from the client workstation indicative of the switch comprises receiving an indication that the second application is an active application.

5. The method of claim 4 wherein the active application is indicated by an active window.

6. The method of claim 2 wherein at least the first set of speech resources or the second set of speech resources comprises:
  a command word to initiate a web browser application, and
  a recognition of a navigational universal resource locator, wherein the web browser navigates to the universal resource locator.

7. The method of claim 2 wherein at least the first set of speech resources or the second set of speech resources comprises:
  a command word, and
  a text representation to be input to a textual file wherein the command word operates as a shortcut for causing the text representation to be input.

8. The method of claim 2 wherein at least the first set of speech resources or the second set of speech resources comprises a command word, the command word causing the client workstation to execute a macro.

9. The method of claim 2 wherein at least the first set of speech resources or the second set of speech resources comprises a command word, the command word causing the client workstation to execute a script.

10. The method of claim 1 further comprising the steps of:
saving the first set of speech resources prior to loading the second set of speech resources.

11. An apparatus for managing speech resources for a plurality of applications, the apparatus comprising:
a resource manager operationally linked to a client workstation, wherein:
the resource manager is configured to receive data from the client workstation regarding a first speech application and a first set of speech resources used by the first speech application, the first speech application being a natural language speech recognition application, wherein the first set of speech resources comprises a first language model and a first user profile, and wherein to provide the data regarding the first speech application and the first set of speech resources to the resource manager, the client workstation is configured to:
initiate the first speech application at the client workstation,
transmit identification of a client initiating the first speech application at the client workstation, and
deliver the first set of speech resources based on at least one of the first speech applications or the identification of the client;
the resource manager is configured to receive data from the client workstation when a second application is initiated at the client workstation, wherein the second application uses a second set of speech resources different than the first set of speech resources; and
the resource manager is configured to save a transcription generated by the first speech application and to fetch the second set of speech resources from a memory and transmit the second set of speech resources to be loaded at the client workstation to facilitate the execution of the second application, the second set of speech resources comprising at least a second language model and a second user profile wherein at least one of the second language model models and the second user profile are different than at least one of the first language model models and the first user profile contained in the first set of speech resources, wherein the first speech application does not need to be terminated prior to initiation of the second application.

\* \* \* \* \*